United States Patent [19]
Holly

[11] Patent Number: 4,866,720
[45] Date of Patent: Sep. 12, 1989

[54] MULTICOLORED LASER SOURCE

[75] Inventor: Sandor Holly, Woodland Hills, Calif.

[73] Assignee: Rockwell International Corporation, El Segundo, Calif.

[21] Appl. No.: 232,183

[22] Filed: Aug. 15, 1988

[51] Int. Cl.$^4$ .............................................. H01S 3/10
[52] U.S. Cl. ........................................ 372/23; 372/22; 372/75
[58] Field of Search ................................... 372/21–23, 372/69, 75

[56] References Cited

U.S. PATENT DOCUMENTS

| | | | |
|---|---|---|---|
| 3,735,280 | 5/1973 | Johnston, Jr. ........................... | 372/23 |
| 4,260,957 | 4/1981 | Congleton et al. .................... | 372/23 |
| 4,293,827 | 10/1981 | McAllister et al. ................... | 372/18 |
| 4,764,930 | 8/1988 | Bille et al. ............................... | 372/75 |

OTHER PUBLICATIONS

Craxton, R. Stephen, "High Efficiency Frequency Tripling Schemes for High-Power Nd:Glass Lasers", 9/81 IEEE, vol. QE-17, No. 9, pp. 1771–1782.

Sinofsky, Edward Lawrence, "The Interferometric Measurement of Phase Mismatch in Potential Second Harmonic Generators", Dissertation, University of Arizona, 1984; University Microfilms International, Ann Arbor, Michigan.

Forrest, Gary T., "Diode-Pumped Solid-State Laser Markets and Production Expand", Laser Focus/Electro-Optics, vol. 24, No. 6, Jun. 1988, pp. 57–74.

Krupke, William F., "Prospects For Diode-Laser-Pumped Solidstate Lasers", Lasers & Optronics, Mar. 1988, pp. 70–84.

*Primary Examiner*—William L. Sikes
*Assistant Examiner*—B. R. R. Holloway
*Attorney, Agent, or Firm*—H. Frederick Hamann; Harry B. Field; David C. Faulkner

[57] ABSTRACT

A method for efficiently producing a multicolored laser beam. The second harmonic of a 1.06 micron wavelength laser beam is produced from a YAG laser. The second harmonic has a wavelength equal to 0.53 micron. The second and third harmonics of a 1.32 micron wavelength laser beam are simultaneously produced from a second YAG laser. The second harmoic has a wavelength equal to 0.66 micron and the third harmonic has a wavelength equal to 0.44 micron. The produced harmonics from the previous steps are combined to form a multicolored laser beam.

2 Claims, 1 Drawing Sheet

4,866,720

MULTICOLORED LASER SOURCE

BACKGROUND OF THE INVENTION

1. Field of the Invention

This invention relates to the production of full-color images and, more particularly, to the utilization of non-linear optics to form a multicolored laser beam.

2. Description of the Prior Art

Various methods are presently being contemplated for use in forming multicolored laser beams for visual display applications. For example, a system utilizing an argon ion laser and a krypton ion laser has been developed by Spectra Physics Corporation and Coherent Radiation, Inc. However, the mixing ranges of such systems are limited by the emitted laser light wavelengths, which are 0.4880 micron, 0.5145 micron and 0.6471 micron. The efficiency of these systems is low and the lasers are large, bulky and heavy. Furthermore, the more powerful units require water-cooling. Other multicolored laser beam mixing schemes use dye lasers in addition to the ion lasers. Use of dye lasers results in even greater system complexity and higher cost than the argon/krypton scheme.

OBJECT AND SUMMARY OF THE INVENTION

It is a primary object of the present invention, therefore, to increase the mixing ranges of multicolored laser beams for visual display applications. It is another object to provide a multicolored laser beam which is highly efficient, rugged, and compact.

Other objects, advantages and novel features of the present invention will become apparent from the following detailed description of the invention when considered in conjunction with the accompanying drawing.

In its broadest aspects the invention comprises a method for efficiently producing a multicolored laser beam. The second harmonic of a 1.06 micron wavelength laser beam is produced from a YAG laser. The second harmonic has a wavelength equal to 0.53 micron. The second and third harmonics of a 1.32 micron wavelength laser beam are simultaneously produced from a second YAG laser. The second harmonic has a wavelength equal to 0.66 micron and the third harmonic has a wavelength equal to 0.44 micron. The produced harmonics from the previous steps are combined to form a multicolored laser beam.

Preferably, the first and second YAG lasers are diode laser pumped.

BRIEF DESCRIPTION OF THE DRAWINGS

The same elements or parts throughout the figures are designated by the same reference characters.

DETAILED DESCRIPTION OF THE INVENTION

Figure 1:
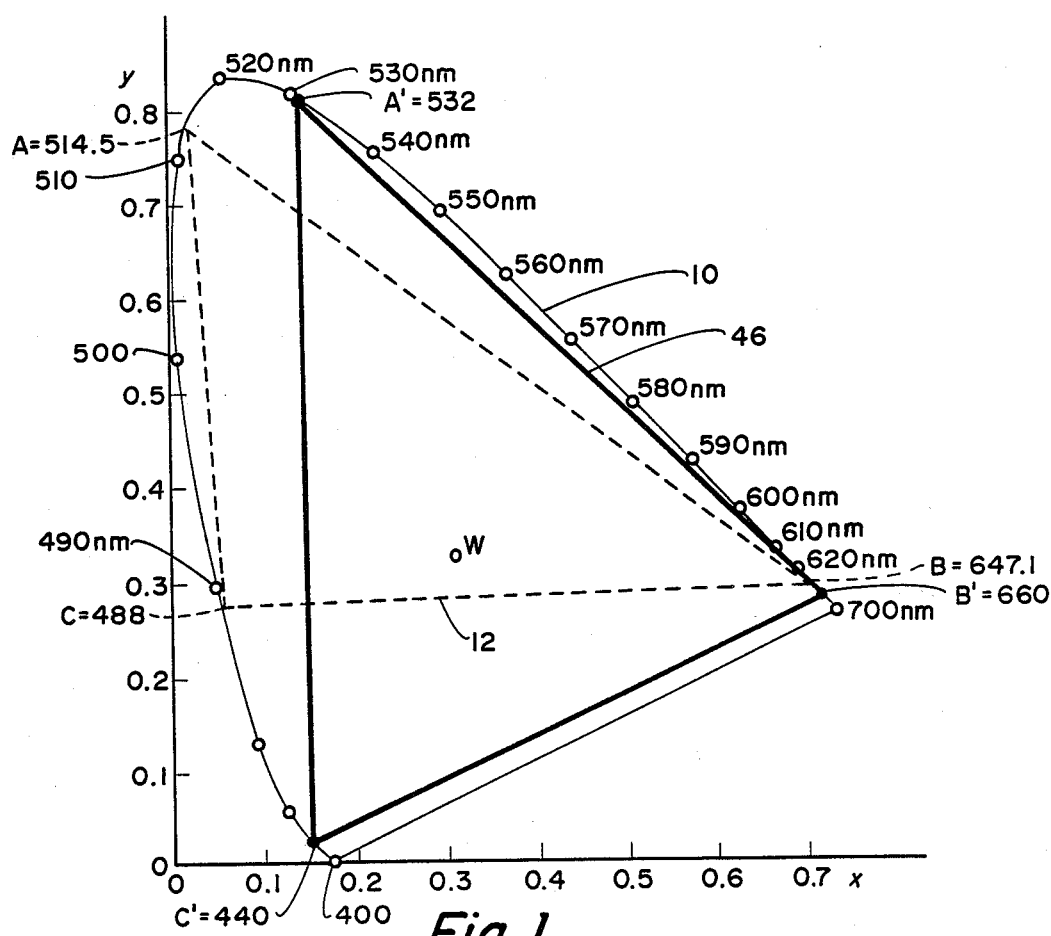
FIG. 1 is a chromaticity diagram illustrating the normal range of the human eye's sensitivity, the color range provided by the prior art, and the color range of the present invention.

A chromaticity diagram is illustrated in FIG. 1. The normal range of the human eye's sensitivity (approximately 400 nm to 700 nm) is outlined by the curve designated 10. Current prior art proposed technology, utilizing an argon ion laser and a krypton ion laser limits colors to the area within the triangle ABC which is designated by the dashed line 12. The vertices (A,B,C) of the triangle are positioned on this chromaticity diagram by the principal wavelengths of the argon and krypton ion laser beams, i.e. $\lambda = 0.4880$, and 0.5145 microns of the blue and green lines of the argon ion laser and $\lambda = 0.6471$ micron of the red line of the krypton ion laser.

Figure 2:
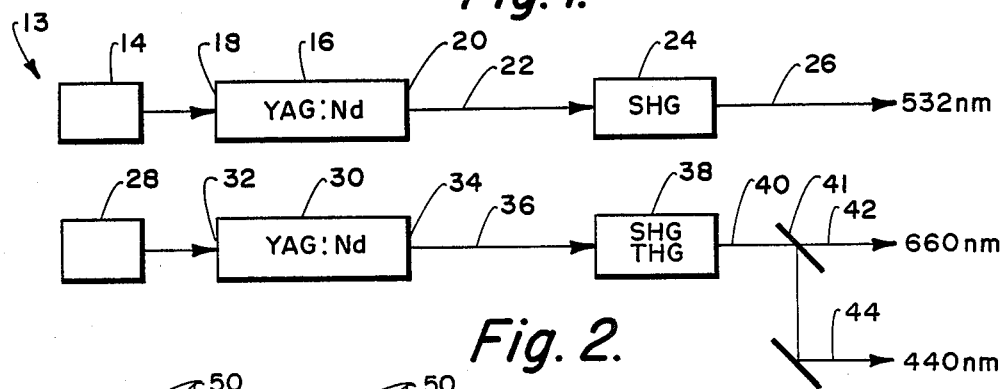
FIG. 2 is a schematic illustration of a preferred embodiment of the present invention.

Referring now to FIG. 2, a preferred embodiment of the present invention is designated generally as 13. A laser diode 14 optically pumps a YAG laser rod 16. The wavelength of the laser diode 14 is typically 0.8 micron. A coating 18 on one end of the YAG laser rod 16 transmits at a wavelength in the vicinity of 0.8 micron and reflects at wavelengths in the 1.06 to 1.4 range. The output end of the laser rod has an optical coating 20 which is partially transmitting in the 1.06 to 1.4 micron range. Optical coating 20 preferably provides maximum reflection at the diode laser pumping wavelength of around 0.8 micron. The resulting output laser beam 22, having a wavelength equal to 1.064 microns, is directed to a second harmonic generator (SHG) 24, thus, generating a green laser output beam 26 with a wavelength of 0.532 micron.

A second laser diode 28 optically pumps a second YAG laser rod 30. A coating 32 on one end of the second rod 30 transmits the laser diode output wavelength in the vicinity of 0.8 micron and maximally reflects at approximately 1.32 microns. The output end of this laser rod has a coating 34 for partial transmittance at the 1.32 micron wavelength range. Coating 32 provides good reflectance at the pumping wavelength of 0.8 micron. The resulting output laser beam 36, having a wavelength equal to 1.32 microns, is directed to another non-linear optical component 3B that is designed to act both as a second harmonic generator (SHG) and a third harmonic generator (THG). The generated light beam 40 is directed to a dichroic beamsplitter 41 that separates the second and third harmonic laser beams, resulting in a red laser beam 42 with a wavelength of 0.66 micron and a blue laser beam 44 with a wavelength of 0.44 micron. The beams 26,42 and 44 are then combined to form a multicolored laser beam. The resulting chromaticity triangle 46 resulting from these three colors is shown with solid lines in FIG. 1 having vertices A', B', and C'.

As noted by reference to this figure, the possible color arrangements are significantly increased over the contemplated prior art technique. Furthermore, it is noted that white light is designated by the point "W" in FIG. 1. In the prior art technique, this point is near the edge of the triangle. In the presently proposed technique, this point lies near the center of the triangle, as preferred. This provides improved excursion capability in color on the chromaticity diagram in all directions away from point "W".

The present invention has several other advantages over currently practiced methods which use the more conventional laser sources:

1. It is highly efficient, because the diode pumping scheme provides the optimal pump energy in the absorption band of the YAG solid state laser and because the pumping source, i.e. the diode laser, is inherently efficient.
2. The age limiting components are solid-state devices, which have experimentally demonstrated long lifetimes. Such solid-state components are inherently rugged.

3. The diode lasers which provide the pumping power for the YAG laser require only low voltages. Therefore, the low voltage in combination with the rugged construction provides high reliability.

4. Furthermore, the solid-state components result in small size and weight.

The possibility of generating colors as proposed by the present applicant has been made possible by a series of breakthroughs in the optics field as enumerated below:

1. Highly efficient second and third harmonic generation of 1.064 and 1.32 microns laser radiation has been demonstrated. (See article by R. Steven Craxton of Laboratory of Laser Energetics, University of Rochester, "High Efficiency Frequency Tripling Schemes for High Powered Glass Lasers", *IEE Journal of Quantum Electronics*, Volume QE-17, September 81).

2. High Power—High efficiency laser diodes that emit in the 0.805 to 0.81 micron wavelength range are now increasingly available. This is an ideal wavelength for pumping YAG lasers (either pulsed or continuous wave).

3. YAG laser system that can emit continuous wave and pulsed radiation at the wavelengths of 1.06 microns and 1.319 microns are now commercially available (e.g., Quantronix Corporation, Amoco Laser Company).

4. Frequency doubling at a wavelength of 1.319 microns has been demonstrated (see, for example, doctoral thesis of Edward Sinowsky entitled "The Interferometric Measurement of Phase Mismatch in Potential Second Harmonic Generators", University of Arizona, University Optics Institute dated 1984).

5. Efficient frequency doubling of diode laser pumped YAG lasers, is now possible (e.g., Spectra Physics Corporation, Amoco Laser Company).

6. There have been recent breakthroughs in producing high efficiency non-linear optical materials such as potassium-titanyl phosphate (KPT). High resistance to optical damage coupled with high efficiency has allowed generation of tens of watts of second harmonic power at 0.53 micron wavelengths (see article by Gary T. Forrest, "Diode-Pumped Solid-State Laser Markets and Production Expand", *Laser Focus/Electro-Optics*. Volume 24, No. 6, June 1988 and article by William F. Krupke, "Prospects For Diode-Laser-Pumped Solid-state Lasers", *Lasers & Optronics*, March 1988, pages 79-84.

7. Diode laser array technology for achieving high power output is now available. This high output power is needed for high efficiency higher harmonic YAG operation.

Figure 3:
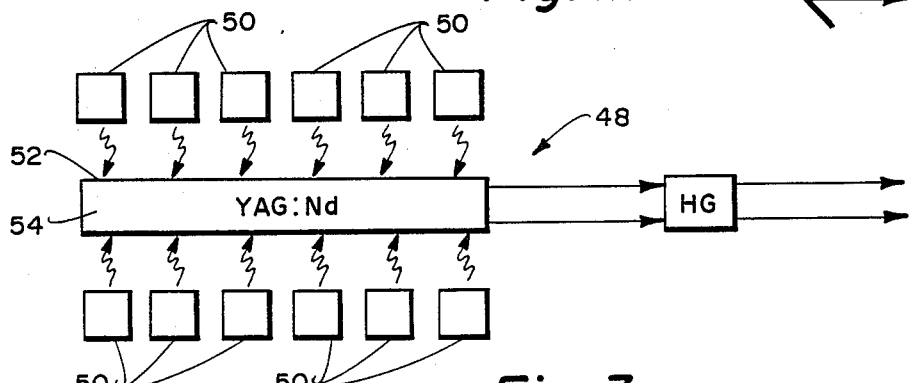
FIG. 3 is a schematic illustration of a second embodiment of the present invention.

Referring now to FIG. 3, a second embodiment of the present invention is shown designated generally as 4B. In this instance, an array consisting of a plurality of axially-spaced diode lasers 50 illuminates the cylindrical surface 52 of a YAG rod 54 for uniform illumination. Utilization of such an array provides high overall pump power available to the YAG rod 54. The diode lasers 50 operating at an output wavelength of around 0.8 micron) are uniformly distributed along the length of the circumference of YAG rod 52. (FIG. 3 shows only one of the preferred YAG laser rods that would normally be utilized.) The YAG rod may be cylindrical in shape (rotationally symmetrical) or it may be rectangular in cross section (slab shaped).

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for efficiently producing a multicolored laser beam, comprising the steps of:
   (a) producing the second harmonic of a 1.06 micron wavelength laser beam from a YAG laser, said second harmonic having a wavelength equal to 0.53 micron;
   (b) simultaneously producing the second and third harmonics of a 1.32 micron wavelength laser beam from a second YAG laser, the second harmonic having a wavelength equal to 0.66 micron and the third harmonic having a wavelength equal to 0.44 micron; and
   (c) combining said produced harmonics from steps (a) and (b), above, to form a multicolored laser beam.

2. The method of claim 1 wherein said first and second YAG lasers are diode laser pumped.

* * * * *